United States Patent
White et al.

(10) Patent No.: US 11,711,719 B2
(45) Date of Patent: Jul. 25, 2023

(54) SYSTEMS AND METHODS FOR DEVICE-ANONYMOUS PERFORMANCE MONITORING IN A WIRELESS NETWORK

(71) Applicant: Verizon Patent and Licensing Inc., Basking Ridge, NJ (US)

(72) Inventors: Brian Matthew White, Port Murray, NJ (US); Ning Zhang, Warren, NJ (US); Andrew F. Patka, Holliston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 65 days.

(21) Appl. No.: 17/402,928

(22) Filed: Aug. 16, 2021

(65) Prior Publication Data

US 2023/0048092 A1 Feb. 16, 2023

(51) Int. Cl.
*H04W 28/02* (2009.01)
*H04W 28/24* (2009.01)
*H04L 67/30* (2022.01)
*H04W 12/06* (2021.01)
*H04W 24/10* (2009.01)

(52) U.S. Cl.
CPC ......... *H04W 28/0268* (2013.01); *H04L 67/30* (2013.01); *H04W 12/06* (2013.01); *H04W 24/10* (2013.01); *H04W 28/24* (2013.01)

(58) Field of Classification Search
CPC . H04W 28/0268; H04W 12/06; H04W 24/10; H04W 28/24; H04L 67/30
See application file for complete search history.

(56) References Cited

U.S. PATENT DOCUMENTS

| | | | |
|---|---|---|---|
| 2018/0212962 A1* | 7/2018 | Reznik | H04W 12/041 |
| 2019/0246334 A1* | 8/2019 | Wang | H04W 48/16 |
| 2020/0241999 A1* | 7/2020 | Guim Bernat | G06F 11/3409 |
| 2022/0377650 A1* | 11/2022 | Kotaru | H04W 28/0268 |

* cited by examiner

*Primary Examiner* — Charles C Jiang
*Assistant Examiner* — Shawn D Miller

(57) ABSTRACT

An application, executed by a User Equipment ("UE"), may receive an identifier, which may be used to monitor Key Performance Indicators ("KPIs") associated with the UE. Such KPIs may be monitored in conjunction with execution of the application, such as at times that the application sends and/or receives traffic. The KPIs may be associated with sensor data, resources, and/or other features or functionality of the UE. The UE may obtain an identifier associated with the application and/or the UE from a KPI monitoring system of some embodiments, may obtain user consent to monitor and/or report KPIs associated with the application, and may provide such KPIs to the KPI monitoring system in conjunction with the identifier. The KPI monitoring system may generate aggregated KPI information, associated with the application, based on the KPIs received from the UE and/or KPIs received from one or more other sources.

20 Claims, 8 Drawing Sheets

SYSTEMS AND METHODS FOR DEVICE-ANONYMOUS PERFORMANCE MONITORING IN A WIRELESS NETWORK

BACKGROUND

Providers of network-enabled services, such as content streaming services, gaming services, file delivery services, etc. may seek to provide such services with at least minimum measures of Quality of Service ("QoS"). Such QoS measures may relate to performance metrics, such as latency, throughput, or other metrics that may impact the user experience.

DETAILED DESCRIPTION OF EXAMPLE EMBODIMENTS

Figure 1A:
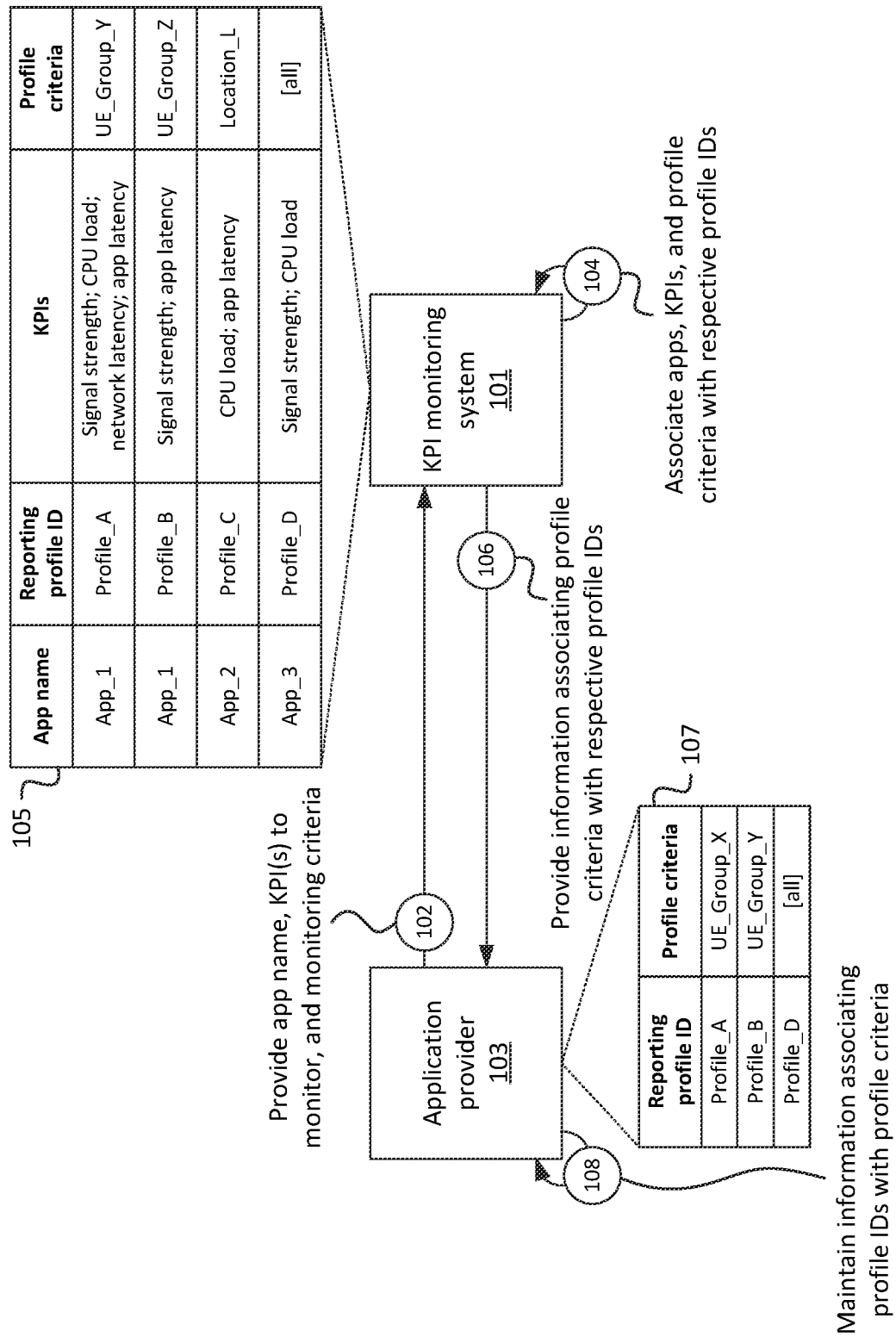
FIGS. 1A and 1B illustrate an example overview of one or more embodiments described herein.

The following detailed description refers to the accompanying drawings. The same reference numbers in different drawings may identify the same or similar elements.

Embodiments described herein provide for the determination of QoS metrics associated with UEs, such as mobile phones, tablets, laptop computers, etc. that execute network-enabled applications associated with one or more services, such as content streaming services, gaming services, file delivery services, etc. Such services may be provided by a Multi-Access/Mobile Edge Computing ("MEC") device, referred to sometimes herein simply as a "MEC," which may be deployed at the "edge" of one or more networks, such as one or more RANs of a wireless network. Additionally, or alternatively, such services may be provided by an application server or some other type of network-accessible device with which the UE may communicate.

As discussed herein, for example, a provider of an application and/or service may include, embed, implement, etc. a Software Development Kit ("SDK"), an application programming interface ("API"), and/or some other suitable communication pathway or function in an application to be executed by a UE. The application may (e.g., via the SDK, the API, etc.) receive one or more identifiers, which may be used to monitor and/or report performance metrics, KPIs, etc. associated with the UE executing the application. Such KPIs may be monitored in conjunction with execution of the application, such as at times that the application sends and/or receives traffic, times that the application performs particular functions, times that the application (or a service associated with the application) is started or stopped at the UE, etc.

The application (e.g., by way of embedding and/or implementing the SDK and/or API of some embodiments) may obtain consent from a user of the UE to monitor, collect, output, etc. such UE performance metrics, KPIs, etc. (referred to herein as "KPIs" for the sake of brevity), and may provide such KPIs to a KPI monitoring system of some embodiments. Such KPIs may be associated with sensor data, resources, and/or other features or functionality of the UE itself, and may not otherwise be readily accessible to the KPI monitoring system or other devices that are external to the UE. For example, such KPIs may relate to system resources of the UE, such as processor resources, memory resources, storage resources, network resources, etc. associated with the UE. In some embodiments, UE attributes may further be provided in accordance with some embodiments (e.g., by the application, the SDK, the API, and/or some other component of the UE), such as UE device type, quantity or type of processors associated with the UE, battery charge level, device temperature, geographical location of the UE, etc. In some embodiments, the KPIs may include or may be based on sensor data associated with the UE, which may include measured or computed values generated or otherwise determined by one or more sensors or input devices of the UE, such as an accelerometer, a touchscreen, a microphone, a barometer, a thermometer, a gyroscope, and/or some other type of sensor or input device.

Based on these UE-specific KPIs and/or attributes, the KPI monitoring system may be better able to determine end-to-end KPIs associated with the application. The determination of such end-to-end KPIs may allow the determination (e.g., by a provider of the application and/or service, and/or by a provider of the network) to determine whether one or more QoS thresholds associated with the application and/or service are met. Further the application provider and/or network provider may be able to remediate any conditions that cause performance KPIs, associated with the application and/or service, based on the determination of end-to-end KPIs and/or the determination of UE-specific KPIs.

For example, in one scenario, the KPI monitoring system of some embodiments may determine that an end-to-end latency associated with a given application is higher than a threshold latency. The KPI monitoring system may further determine that network latency associated with communications, between the UE and an application server, MEC, etc. that provides services associated with the application, is relatively low (e.g., below a threshold), but that processing resources associated with the UE are relatively overloaded (e.g., above a threshold level of processor load). In such scenarios, the UE and/or the application provider may be alerted as to the detected processor load, in order to allow a user of the UE and/or the application provider to make adjustments (e.g., the user may close other running applications, the application provider may modify one or more parameters of the application in order to reduce processor utilization, etc.). Further, in such a scenario, adjustments to the network may not be made, as the primary factor in the end-to-end latency exceeding the threshold latency may be the processor load of the UE rather than parameters of the network.

In another example scenario, assume that the KPI monitoring system of some embodiments determines that the end-to-end latency associated with the application is higher than the threshold latency, and further that network latency associated with communications, between the UE and the application server, MEC, etc., is relatively high (e.g., above a threshold). Further assume that the KPI monitoring system determines that the load on processing resources associated with the UE are below a threshold level of processor load. In such a scenario, adjustments to the network (e.g., modifications of QoS parameters, modifications of routing parameters, etc.) may be made in order to reduce latency introduced by the network. Further, adjustments to the UE and/or the application may not be made, as the primary factor in the end-to-end latency exceeding the threshold latency, in this example, may be related to the parameters of the network, rather than the processor load of the UE. Thus, enhanced granularity and accuracy in KPI monitoring associated with network services provided to UEs, and the determination and performance of suitable remedial measures, may be provided in accordance with embodiments described herein.

As shown in FIG. 1A, KPI monitoring system 101 may receive (at 102) identifying information for one or more applications from application provider 103. For example, application provider 103 may communicate with KPI monitoring system 101 via one or more networks, an API, a web portal, a configuration interface, and/or some other suitable communication pathway provided by or otherwise associated with KPI monitoring system 101. The communication (at 102) may be associated with a registration procedure or other suitable procedure, which may be initiated by application provider 103 (e.g., by a user associated with application provider 103, and/or via an automated process). The registration procedure or other suitable procedure may be associated with one or more applications and/or services provided by or otherwise associated with application provider 103. For example, application provider 103 may register a particular application for monitoring of KPIs associated with one or more UEs that install and/or execute the application. As noted above, the monitoring of KPIs associated with execution of the application at such UEs (e.g., relating to processing resources, memory resources, storage resources, device attributes, etc.) may provide further insight as to the performance of the application and/or the UEs, based on which modifications to the application, the UEs, one or more networks, etc. may be determined.

The identifying information may include an application name, application identifier, a cryptographic hash value, and/or some other suitable type of identifier (referred to in the figures as "app name"). In some embodiments, application provider 103 may also provide (at 102) a set of KPIs to monitor at a UE that installs and/or executes the application. As noted above, such KPIs may relate to resources, attributes, and/or other information associated with the UE.

For example, the KPIs and/or attributes may include a measure of load of one or more Central Processing Units ("CPUs") and/or other types of processors of the UE, processor speed, quantity of processor cores, memory (e.g., RAM) capacity, a measure of available and/or utilized memory, a measure of storage capacity, a measure of available and/or utilized storage, a measure of network latency (e.g., a measure of round trip delay between the UE and one or more devices or systems via one or more networks), a measure of application latency (e.g., a measure of delay between an input to the application and an output generated by the application), a measure of signal strength and/or quality (e.g., Signal-to-Interference-and-Noise-Ratio ("SINR"), Received Signal Strength Indicator ("RSSI"), Channel Quality Indicator ("CQI"), etc.) of wireless communications between the UE and one or more networks, and/or other suitable KPIs and/or attributes. As discussed below, consent from a user of the UE may be obtained prior to the providing of any such information regarding the UE to a network, device, or system that is external to the UE.

In some embodiments, application provider 103 may associate a particular application with multiple reporting profiles, where different profiles are associated with different sets of KPIs and/or attributes to monitor. Different profiles may be associated with different profile criteria, where UEs matching a particular set of profile criteria may monitor and report KPIs indicated by a reporting profile that corresponds to the particular set of profile criteria. For example, profile criteria may specify a particular set of UEs, such as identifiers of the particular set of UEs. Such identifiers may include Internet Protocol ("IP") addresses, International Mobile Station Equipment Identity ("IMEI") values, International Mobile Subscriber Identity ("IMSI") values, Mobile Directory Numbers ("MDNs"), or other suitable types of identifiers. In some embodiments, such identifiers may include a range of identifiers, a regular expression, an identifier of a group or organization with which UEs are associated, and/or other suitable logic that may define groups of UEs. In some embodiments, profile criteria may be provided (e.g., by application provider 103) on the basis of geographical location, tracking area ("TA"), network slice (e.g., where different slices of a network are associated with different sets of QoS parameters), or other suitable criteria.

In some embodiments, application provider 103 may specify (at 102) KPI measurement parameters, such as an interval or frequency at which particular KPIs should be measured, a manner in which KPIs should be measured or computed, and/or other suitable parameters. As one example, such KPI reporting parameters may indicate that CPU load of a UE should be measured 30 times per second, that a storage capacity of the UE should be measured every 2 seconds, etc. As another example, the KPI reporting parameters may indicate that a "snapshot" measurement for a given KPI should be determined on a given interval (e.g., an amount of storage capacity measured every 2 seconds), that an average value of the KPI should be determined on a given interval (e.g., an average storage capacity over a 2-second period), etc.

KPI monitoring system 101 may, based on the information provided (at 102) by application provider 103, maintain (at 104) information associating different sets of KPIs for different applications (and/or for different reporting profile criteria associated with one or more applications) to different reporting profiles. For example, KPI monitoring system 101 may maintain example data structure 105, which may associate applications, sets of KPIs to monitor, and profile criteria to different profile identifiers ("IDs"). In the example shown here, data structure 105 may include two different profiles (e.g., with profile identifiers "Profile_A" and "Profile_B") for the same application ("App_1"). The first profile (Profile_A) may be associated with a first set of profile criteria and a first set of KPIs to monitor, while the second profile (Profile_B) may be associated with a different second set of profile criteria and a different second set of KPIs to monitor. Specifically, for instance, the first profile may indicate that signal strength, CPU load, network latency, and application latency should be monitored for UEs executing the application (App_1), and/or accessing a network service associated with the application. The first profile may further indicate that the first profile is applicable to UEs of a first group (UE_Group_Y). As noted above, the indication of the group may include a group or organization identifier, one or more identifiers of one or more UEs, or other suitable indication. That is, the first profile may specify that the first set of KPIs should be monitored for UEs of the first group (and for which consent has been provided by users of such UEs for such KPI monitoring). Similarly, the second profile may specify that the second set of KPIs should be monitored for UEs of the second group.

As further shown, data structure 105 may include information for a different application (App_2), such as information specifying that a third set of KPIs should be monitored for UEs meeting a third set of reporting criteria. In this example, the third set of profile criteria may specify a location. The location may be specified as one or more latitude and longitude coordinates, Global Positioning System ("GPS") coordinates, a city, a TA, and/or some other suitable indication of location.

Some applications may be associated with profile criteria that are not necessarily met by all UEs that install or access the applications. For example, while UEs located at Location_L may meet the criteria associated with Profile_C, UEs not located at Location_L may not meet the criteria associated with Profile_C, and no KPI measurements may accordingly be performed at such UEs, in accordance with some embodiments.

On the other hand, some applications may be associated with profile criteria that are met by all UEs that install or access the applications. For example, as shown, data structure 105 may include information regarding a fourth profile (Profile_D) for a third application (App_3), for which "[all]" (or some other suitable indicator) may be included as profile criteria. As such, KPI monitoring may be performed, in accordance with some embodiments, by all UEs that install or access App_3 (and for which consent for the KPI monitoring is received from users of such UEs).

KPI monitoring system 101 may further provide (at 106) information associating profile criteria with respective profile identifiers. Referring to the example information shown in data structure 105, KPI monitoring system 101 may provide (at 106) an indication to application provider 103 that the first profile criteria (UE_Group_Y) is associated with the first profile identifier (Profile_A), that the second profile criteria (UE_Group_Z) is associated with the second profile identifier (Profile_B), and that the fourth profile criteria ([all]) is associated with the fourth profile identifier (Profile_D). In this example, application provider 103 may be associated with multiple applications (e.g., may have registered (at 102) monitoring criteria for App_1 and App_3), and may therefore receive information from KPI monitoring system 101 regarding reporting profiles for the multiple applications. In this example, application provider 103 may not be associated with App_2, and may therefore not receive (at 106) information regarding Profile_C, with which App_2 is associated. In some embodiments, as described further below with respect to FIG. 1B, KPI monitoring system 101 may provide additional information to application provider 103 based on associating (at 104) applications, KPIs, and/or profile criteria with respective reporting profiles.

Based on receiving (at 106) the information associating profile criteria with respective reporting profile identifiers, application provider 103 may maintain (at 108) such information, such as in data structure 107 and/or some other suitable data structure. For example, as shown, application provider 103 may store (e.g., in data structure 107) information associating reporting profile identifiers Profile_A, Profile_B, and Profile_D with reporting profile criteria UE_Group_X, UE_Group_Y, and [all], respectively. In some embodiments, data structure 107 may include additional and/or different information. For example, data structure 107 may, in some embodiments, store some or all of the same types of information included in data structure 105. In such embodiments, data structure 105 may include, for example, an indication that Profile_A and Profile_B are associated with App_1, and that Profile_D is associated with App_3. Additionally, or alternatively, data structure 105 may include an indication that Profile_A is associated with the first set of KPIs to monitor, that Profile_B is associated with the second set of KPIs, and so on. As discussed below, application provider 103 may use such information (e.g., as stored in data structure 107 or some other suitable data structure) to indicate, to UEs executing one or more applications associated with application provider 103, which KPIs to monitor and report to KPI monitoring system 101.

Figure 1B:
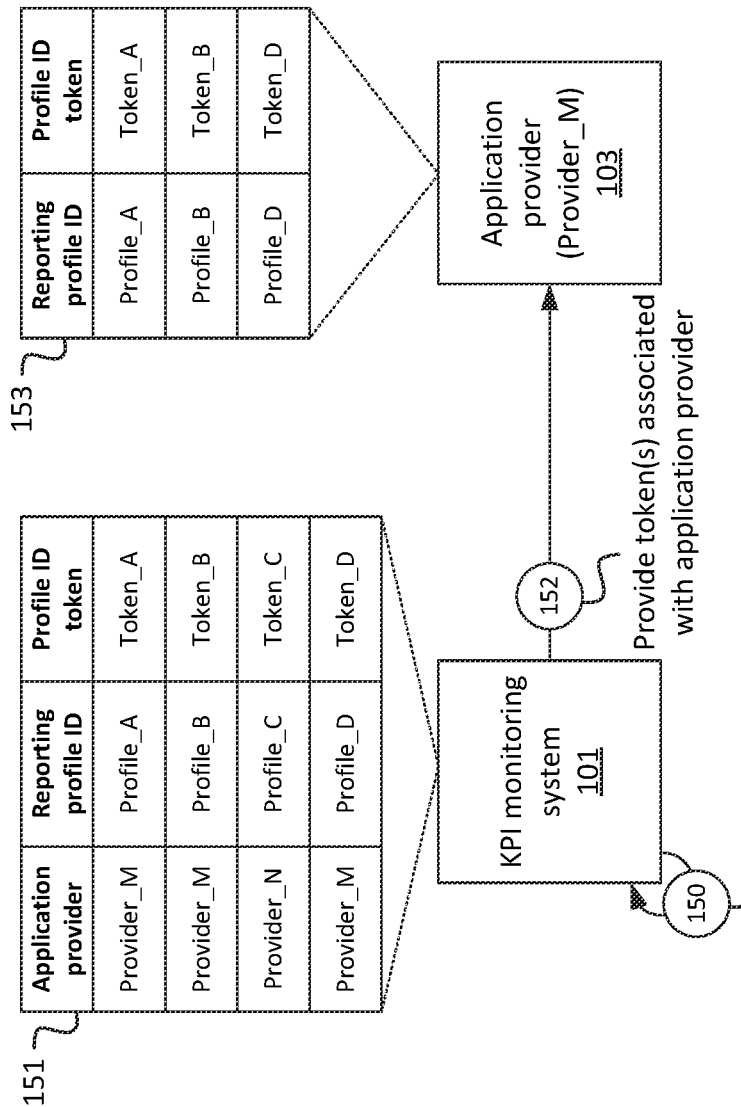

FIG. 1B illustrates a further example of registration procedure of application provider 103 with KPI monitoring system 101. The operations shown in FIG. 1B may be performed in conjunction with, after, and/or otherwise based on one or more operations shown in FIG. 1A, such as the providing (at 102) of one or more application identifiers (e.g., app names) and corresponding KPIs to KPI monitoring system 101 by application provider 103. For example, based on receiving (at 102) such information from multiple application providers 103, such as a first application provider 103 ("Provider_M") and a second application provider 103 ("Provider_N"), KPI monitoring system 101 may generate (at 150) authentication information, such as one or more authentication tokens or other suitable authentication information, for each KPI monitoring system 101 and/or for each reporting profile associated with applications provider. For example, as shown, a first reporting profile (Profile_A) may be associated with a first authentication token (Token_A), a second reporting profile (Profile_B) may be associated with a second authentication token (Token_B), and so on. In some embodiments, KPI monitoring system 101 may maintain information, associating authentication tokens with reporting profiles and/or applications provider, in data structure 151 or some other suitable data structure.

KPI monitoring system 101 may provide (at 152) one or more authentication tokens to respective applications provider with which the authentication tokens are associated. For example, KPI monitoring system 101 may provide Token_A, Token_B, and Token_D to a particular application provider 103 (Provider_M) with which these authentication tokens are associated. Application provider 103 may maintain information, associating authentication tokens with corresponding reporting profiles in data structure 153 or some other suitable data structure.

In this example, each reporting profile is associated with a different authentication token. In some embodiments, multiple reporting profiles for the same application provider 103 may be associated with the same authentication token. For example, in such embodiments, Profile_A, Profile_B, and Profile_D may all be associated with the same authentication token, as these reporting profiles are associated with the same application provider 103 (e.g., Provider_M). As discussed below, application provider 103 may use the authentication token in order to securely obtain KPI information reported by one or more UEs executing one or more applications associated with application provider 103, in accordance with some embodiments.

Figure 2:
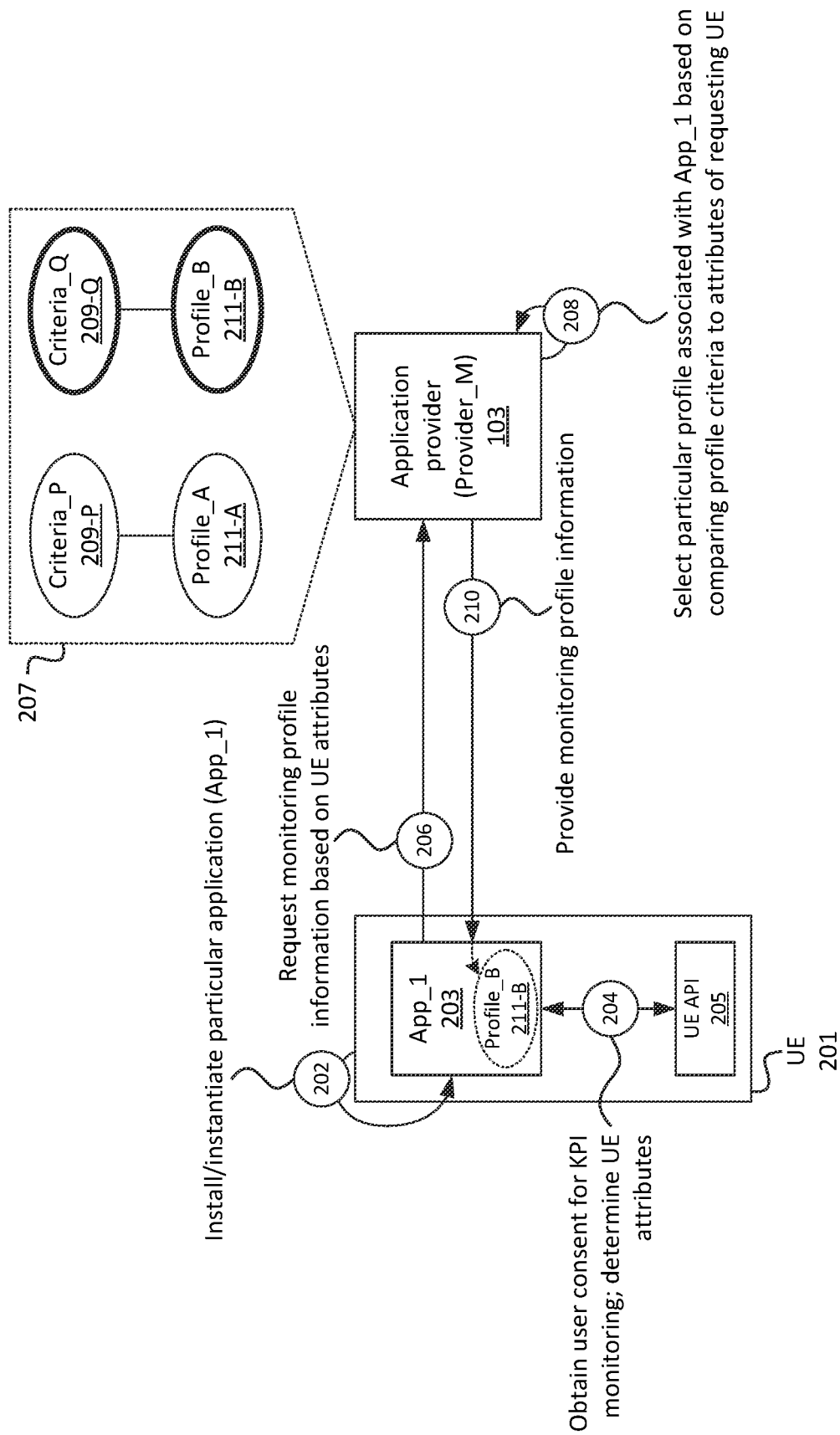
FIG. 2 illustrates an example of providing Key Performance Indicator ("KPI") monitoring information, associated with a particular application, to a User Equipment ("UE"), in accordance with some embodiments.

As shown in FIG. 2, a particular UE 201 may install, instantiate, access, etc. a particular application 203 (e.g., App_1) that is associated with a particular application provider 103 (e.g., Provider_M). As noted above, application 203 may be associated with an SDK, an API, etc. and/or may otherwise be configured to communicate with application provider 103 in order to obtain KPI reporting profile information (e.g., a set of UE KPIs to monitor, an interval at which such KPIs should be monitored, etc.).

In some embodiments, application 203 may obtain (at 204) user consent from a user of UE 201 to monitor and/or report KPIs and/or attributes associated with UE 201. For example, application 203 may communicate with an operating system, kernel, and/or other component of UE 201 via UE API 205 and/or some other suitable communication pathway, to obtain the user consent. For example, application 203 may instruct (e.g., via UE API 205) UE 201 to present a prompt (e.g., a visual prompt, an audible prompt, etc.) requesting user consent to monitor and/or report UE KPIs and/or attributes when using application 203. Assuming user consent is obtained, application 203 may obtain (e.g., via UE API 205) attribute information associated with UE 201, such as one or more identifiers of UE 201, a location of UE 201, a device type of UE 201, and/or other attributes of UE 201.

Application 203 may further request (at 206) monitoring profile information for application 203, based on attributes of UE 201, from application provider 103. Application provider 103 may select (at 208) a particular reporting profile, associated with the particular application 203 (i.e., App_1 in this example), based on association information 207. Association information 207 may be or may include some or all of the example information described above with respect to data structure 105. In some embodiments, one instance of association information 207 may be associated with one particular application 203 (e.g., App_1), while other instances of association information 207 may be associated with other applications 203 with which application provider 103 is associated. As similarly discussed above, association information 207 may associate a first set of profile criteria 209-P (Criteria P) with a first reporting profile 211-A, and may associated with a second set of profile criteria 209-Q (Criteria_Q) with a second reporting profile 211-B.

Application provider 103 may compare (at 208) attributes of UE 201 to different sets of profile criteria 209 (e.g., profile criteria 209-P and 209-Q, in this example). Based on this comparison, application provider 103 may identify that attributes of UE 201 meet the second set of profile criteria 209-Q, and therefore that profile 211-B is associated with UE 201. Application provider 103 may accordingly provide (at 210) information indicating the selected (at 208) reporting profile 211-B to UE 201 (e.g., to application 203). For example, application provider 103 may provide an identifier of the selected reporting profile, may indicate KPIs to monitor (e.g., KPIs associated with the selected profile), may indicate a reporting or monitoring interval associated with such KPIs, and/or may provide other suitable information. In some embodiments, application 203 may maintain information associating different profile identifiers with different KPIs to monitor, and may identify a particular set of KPIs to monitor based on receiving (at 210) a profile identifier from application provider 103. In some embodiments, in addition to, or in lieu of, communicating (at 206 and 210) with application provider 103, UE 201 (e.g., via application 203) may communicate with KPI monitoring system 101 in order to obtain profile monitoring information.

Figure 3:
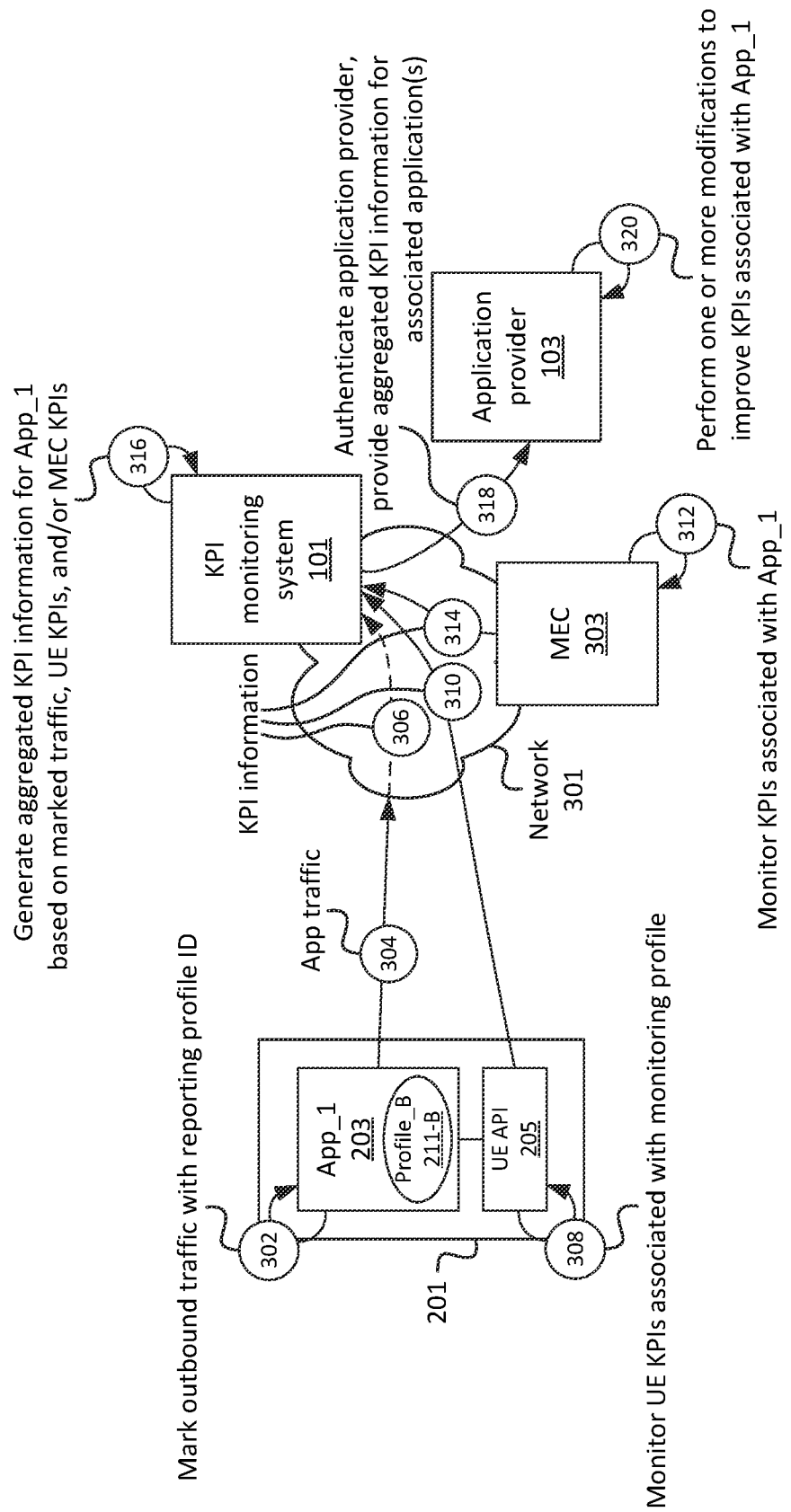
FIG. 3 illustrates an example of receiving KPI information associated with a particular application from a UE and/or other sources, based on an identifier that is associated with the particular application, in accordance with some embodiments.

UE 201 may accordingly monitor and/or report KPIs associated with the indicated reporting profile. For example, as shown in FIG. 3, application 203 may mark (at 302) outbound traffic associated with the application with an identifier of the provided reporting profile (e.g., Profile_B), in this example. For example, application 203 may add the profile identifier and/or some other value that is based on the profile identifier to an IP header or other suitable header information of the traffic. UE 201 (e.g., application 203) may output (at 304) the application traffic (e.g., with the identifier of the reporting profile) via one or more networks, such as network 301, to a destination associated with application 203. In some embodiments, the destination may be or may include MEC 303 that is deployed at an edge of network 301, such as at a base station of a RAN associated with network 301. In some embodiments, the destination of the traffic (output at 304) may be an application server that is accessible via the Internet or some other network, and/or some other device or system that provides services associated with application 203.

In some embodiments, one or more network devices or systems of network 301, such as one or more routers, switches, hubs, datacenters, etc., may identify the reporting profile identifier (e.g., by examining header information of the traffic), and may determine KPI information associated with the traffic. In some embodiments, such network devices or systems may communicate with KPI monitoring system 101 via an API or other suitable communication pathway to receive configuration information indicating reporting profile identifiers and/or KPIs to monitor for traffic that includes such profile identifiers. The one or more network devices or systems of network 301 may generate or determine KPI information, such as throughput, latency, jitter, etc. associated with traffic having particular profile identifiers. In some embodiments, the one or more network devices or systems of network 301 may generate, determine, organize, etc. KPI information on the basis of one or more other factors in addition to or in lieu of profile identifiers, such as UE identifiers, UE location, and/or other suitable information. The one or more network devices or systems of network 301 may provide (at 306) the KPI information, regarding the application traffic (output at 304) to KPI monitoring system 101 via an API or other suitable communication interface. As denoted by the dashed line in FIG. 3, this communicating (at 306) of KPI information may not necessarily include communicating the application traffic itself to KPI monitoring system 101.

UE 201 may further monitor (at 308) KPIs associated with UE 201, as indicated by the particular monitoring profile 211 (i.e., profile 211-B, in this example) provided (e.g., at 210 of FIG. 2) to UE 201. For example, UE API 205 and application 203 may communicate in order to monitor some or all of the KPIs associated with the particular monitoring profile. For example, application 203 may indicate times at which application traffic has been sent or received by application 203, amounts of application traffic sent or received by application 203, times at which communication sessions (e.g., voice calls, video conferences, gaming sessions, etc.) associated with application 203 have started or ended, or other suitable information. UE API 205 may additionally receive information from application 203, indicating UE KPIs to monitor (e.g., KPIs associated with reporting profile 211-B), such as signal strength information, battery charge status, UE sensor information (e.g., temperature information, accelerometer information, etc.), UE location information, and/or other types of information that may be measured, monitored, etc. by UE 201.

In some embodiments, the UE KPI information may be provided to UE API 205 by an operating system or kernel of UE 201, and/or some other suitable component of UE 201 that measures and/or reports UE KPIs to UE API 205. UE 201 (e.g., via UE API 205) may further output (at 310) the UE KPI information to KPI monitoring system 101. In some embodiments, UE 201 may output the UE KPI information to KPI monitoring system 101 on an interval specified by reporting profile 211-B, and/or otherwise in accordance with parameters specified by reporting profile 211-B. In some embodiments, UE 201 may output the UE KPI information without identifying information regarding UE 201 (e.g., an MDN, an IMEI value, an IMSI value, an MDN, or the like). In this manner, the KPI information may be "anonymous" in that particular UEs 201 may not be able to be linked to particular KPI information, thus preserving privacy of users of such UEs 201.

In some embodiments, MEC 303 may monitor (at 312) KPIs associated with application traffic sent and/or received to and/or from UE 201 (e.g., to and/or from application 203), and may also report (at 314) such KPIs to KPI monitoring system 101. In this manner, KPI monitoring system 101 may receive KPI information, associated with the execution of application 203 (and/or the access of one or more services associated with application 203) by UE 201, from multiple sources, and may generate (at 316) aggregated KPI information associated with application 203 based on the KPI information received from the multiple sources.

As one example, KPI monitoring system 101 may receive (at 306) information regarding a network latency associated with traffic, associated with application 203 (e.g., marked with an identifier of reporting profile 211-B). The network latency may be based on, for example, an amount of time (e.g., delay time) between receiving traffic from UE 201 (e.g., traffic associated with application 203) and providing the traffic to an indicated destination of the traffic, such as MEC 303.

Continuing with the above example, UE API 205 may monitor one or more measures of processor load, memory load, storage capacity, etc. associated with UE 201 at times that correspond to the operation of application 203. For example, such times may include times at which application 203 sends and/or receives traffic, a particular interval (e.g., as indicated by reporting profile 211-B), and/or other times which may be indicated by application 203. In some embodiments, when providing (at 310) the monitored UE KPI information to KPI monitoring system 101, UE API 205 may further include timestamp information, which KPI monitoring system 101 may utilize to generate (at 316) the aggregated KPI information.

Further continuing with this example, KPI monitoring system 101 may also receive information regarding an application latency associated with MEC 303, such as an amount of time in between MEC 303 receiving an input (e.g., traffic from UE 201) and generating an output (e.g., traffic destined for UE 201) based on the input. One example of such input and/or output may include an augmented reality application, in which application 203 provides (at 304) captured video content (e.g., captured by a camera associated with UE 201) to MEC 303 as input, and MEC 303 generates augmented video content (e.g., with one or more overlays, filters, or other processing) based on the provided video. The amount of time in between receiving the captured video content and generating or outputting the augmented video content may, in this example, be considered as the application latency associated with MEC 303.

Thus, in the above example, the aggregated KPI information may include end-to-end KPIs (e.g., latency and/or other KPIs) associated with one or more communications between UE 201 and MEC 303 (e.g., via network 301), as well as UE metrics at times that correspond to the end-to-end KPIs. In this manner, factors leading to degraded or lower than threshold performance associated with application 203 may be readily identified, even when such factors are associated with the operation of UE 201 itself.

For example, application provider 103 may receive and/or access (at 318) the aggregated KPI information associated with application 203 (and/or one or more other applications with which application provider 103 is associated), in order to analyze such information and identify potential parameters or factors that may be modified to improve performance associated with application 203. In some embodiments, KPI monitoring system 101 may authenticate application provider 103 prior to providing the aggregated KPI information to application provider 103. For example, application provider 103 may provide an authentication token associated with one or more particular reporting profiles, applications 203, and/or application provider 103, and KPI monitoring system 101 may authenticate the authentication token to verify that application provider 103 is authorized to access the KPI information.

As noted above, application provider 103 may perform (at 320) one or more modifications based to improve KPIs associated with application 203. For example, UE KPIs (e.g., as received at 310) associated with one or more UEs 201 executing application 203 may indicate increased processor load when performing a particular function of application 203. Application provider 103 may modify aspects of application 203 (e.g., modify source code, modify application libraries, etc.) in order to reduce processor load of UEs 201 utilizing the particular function of application 203.

As another example, UE KPIs associated with a first UE 201 may indicate relatively high levels of processor load and a relatively low measure of end-to-end performance (e.g., end-to-end latency above a threshold), while UE KPIs associated with multiple other UEs 201 may indicate relatively low levels of processor load and a relatively high measure of end-to-end performance (e.g., end-to-end latency below a threshold). In this situation, application provider 103 may output an alert to the first UE 201 (e.g., via application 203 and/or UE API 205) that application 203 may be experiencing degraded performance due to greater-than-normal (e.g., where "normal" in this example refers to the processor load of the first UE 201 being higher than the processor load of the other UEs 201) processor load. UE API 205 and/or a user of the first UE 201 may therefore be alerted that the performance of application 203 is not as expected due to the processor load of UE 201, and may take action to remedy the increased processor load of UE 201. Such action may include uninstalling or disabling particular applications or features of UE 201, or other suitable actions.

As another example, UE KPIs associated with a second UE 201 may indicate a relatively low measure of signal strength and a relatively low measure of end-to-end performance (e.g., end-to-end latency above a threshold), while KPIs associated with network 301 and MEC 303 indicate relatively low levels of latency. In this example, application provider 103 may determine that the relatively low measure of end-to-end performance associated with the execution of application 203 by the second UE 201 is due to the low measure of signal strength, and may output (e.g., via application 203 and/or UE API 205) an indication that application 203 may be experiencing degraded performance due to signal strength associated with UE 201 being below a threshold. A user of UE 201 may be alerted to take action to improve the signal strength (e.g., move to a location that is closer to a wireless access point, remove obstructions or objects that may affect signal strength, etc.), and/or UE 205 may modify parameters of UE 201 to improve signal strength (e.g., increase an antenna gain of one or more antennas of UE 201, modify beamforming parameters associated with UE 201, etc.).

Figure 4:
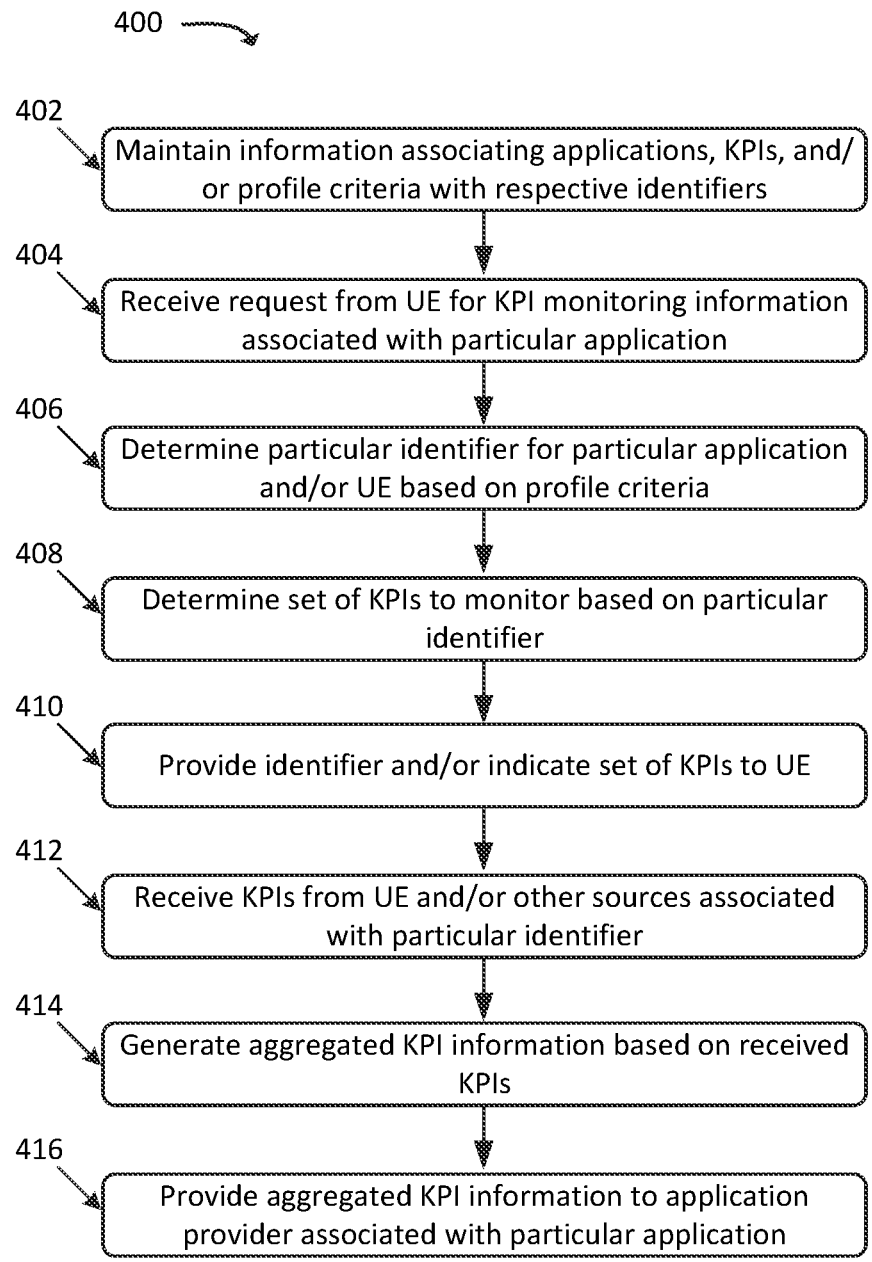
FIG. 4 illustrates an example process for monitoring KPI information associated with execution of an application at a UE, in accordance with some embodiments.

FIG. 4 illustrates an example process 400 for monitoring KPI information associated with execution of a particular application 203 at a particular UE 201. In some embodiments, some or all of process 400 may be performed by KPI monitoring system 101. In some embodiments, one or more other devices may perform some or all of process 400 (e.g., in concert with, and/or in lieu of, KPI monitoring system 101).

As shown, process 400 may include maintaining (at 402) information associating applications, KPIs, and/or profile criteria with respective identifiers. For example, as discussed above, KPI monitoring system 101 may maintain information (e.g., in data structure 105 or in some other suitable manner) that associates particular applications with particular identifiers, such as profile identifiers. In some situations, as discussed above, the same application may be associated with multiple profile identifiers, where different profile identifiers for the same application are associated with different profile criteria and/or different sets of KPIs to be monitored by UEs 201 fitting such criteria. KPI monitoring system 101 may receive such information from one or more applications provider that are associated with respective applications.

As noted above, KPI monitoring system 101 may register a given application provider 103 as being associated with a particular application or monitoring profile. The registering may include generating an authentication token and providing the authentication token to application provider 103, which application provider 103 may subsequently use in an authentication process with KPI monitoring system 101 to verify that application provider 103 is authorized to access KPIs monitored by one or more UEs 201 based on a respective monitoring profile.

Process 400 may further include receiving (at 404) a request from a particular UE 201 for KPI monitoring information associated with a particular application 203. For example, as discussed above, the particular application 203 may include and/or implement an SDK, an API, or the like, that is configured to communicate with KPI monitoring system 101 in order to request KPI monitoring information associated with application 203. In some embodiments, the request may include attributes of UE 201, such as an identifier of UE 201, a location of UE 201, and/or other attributes of UE 201. In some embodiments, UE 201 (e.g., via the SDK, API, etc.) may have obtained user consent to perform KPI monitoring and/or to provide attributes of UE 201 to KPI monitoring system 101. In some embodiments, UE 201 may have obtained user consent multiple times for multiple operations, such as a first user consent to provide UE attribute information to KPI monitoring system 101, and second user consent to begin monitoring particular KPIs indicated by KPI monitoring system 101.

Process 400 may additionally include determining (at 406) a particular identifier for the particular application 203 and/or UE 201 based on the profile criteria associated with multiple different reporting profile identifiers. For example, KPI monitoring system 101 may compare attributes of UE 201 to different sets of profile criteria in order to identify one or more sets of profile criteria, for the particular application 203, that match the attributes of UE 201.

Process 400 may also include determining (at 408) a set of KPIs for UE 201 to monitor based on the particular identifier. For example, KPI monitoring system 101 may identify a set of KPIs, indicated in data structure 105 or some other suitable data structure, that is associated with the selected particular profile identifier. As noted above, such KPIs may include KPIs and/or other information that may be measured or determined by UE 201, such as KPIs relating to system resources of UE 201 (e.g., processing resources, memory resources, storage resources, etc.), sensor data measured or collected by UE 201, and/or other suitable information.

Process 400 may further include providing (at 410) the identifier to UE 201. For example, KPI monitoring system 101 may communicate with the SDK, API, etc. associated with application 203 to provide the selected profile identifier. In some embodiments, KPI monitoring system 101 may indicate the set of KPIs associated with the profile identifier. In some embodiments, UE 201 (e.g., by way of the SDK, API, etc.) may identify the set of KPIs to monitor based on the profile identifier. As discussed above, UE 201 may proceed to monitor the KPIs in conjunction with execution of the application, such as at times that correspond to when the application sends and/or receives traffic (e.g., to and/or from MEC 303, an application server, network 301, and/or some other device or system), times at which application 203 is opened or closed, times at which application 203 performs particular functions (e.g., starts or stops a voice call or videoconference, performs a particular computation, calls a particular subroutine, etc.), and/or at other suitable times associated with the execution of application 203. As noted above, in some embodiments, application 203 may mark outbound traffic associated with application 203 with the identifier and/or some value that is based on the identifier, such that network devices that receive the traffic may identify that the traffic is associated with the particular application 203 and/or the reporting profile associated with the identifier.

Process 400 may additionally include receiving (at 412) the monitored KPIs from UE 201 and/or other sources. For example, as discussed above, KPI monitoring system 101 may receive KPIs, which may include an indication of the particular profile identifier, from UE 201, MEC 303, network devices of network 301, and/or other devices or systems.

Process 400 may also include generating (at 414) aggregated KPI information based on the received KPIs. For example, KPI monitoring system 101 may identify KPI information from multiple sources (e.g., including UE 201, MEC 303, network 301, etc.), and may aggregate, cluster, organize, etc. such KPI information, may generate models (e.g., artificial intelligence/machine learning ("AI/ML") models) based on the KPI information, and/or may perform other computations on the KPI information.

Process 400 may further include providing (at 416) the aggregated KPI information to a particular application provider 103 associated with the particular application 203. For example, as discussed above, KPI monitoring system 101 may authenticate application 203 based on an authentication token provided by KPI monitoring system 101 (e.g., by matching the authentication token to a previously generated authentication token, as discussed above). Additionally, or alternatively, KPI monitoring system 101 may "push" the aggregated KPI information to application provider 103, and/or may provide such KPI information to application provider 103 in some other suitable manner. In some embodiments, KPI monitoring system 101 and/or application provider 103 may modify one or more parameters of UE 201, application 203, network 301, and/or some other device or system based on the KPI information receive from UE 201 and/or the aggregated KPI information generated by KPI monitoring system 101, in order to improve end-to-end KPIs associated with execution of application 203 by one or more UEs 201.

Figure 5:
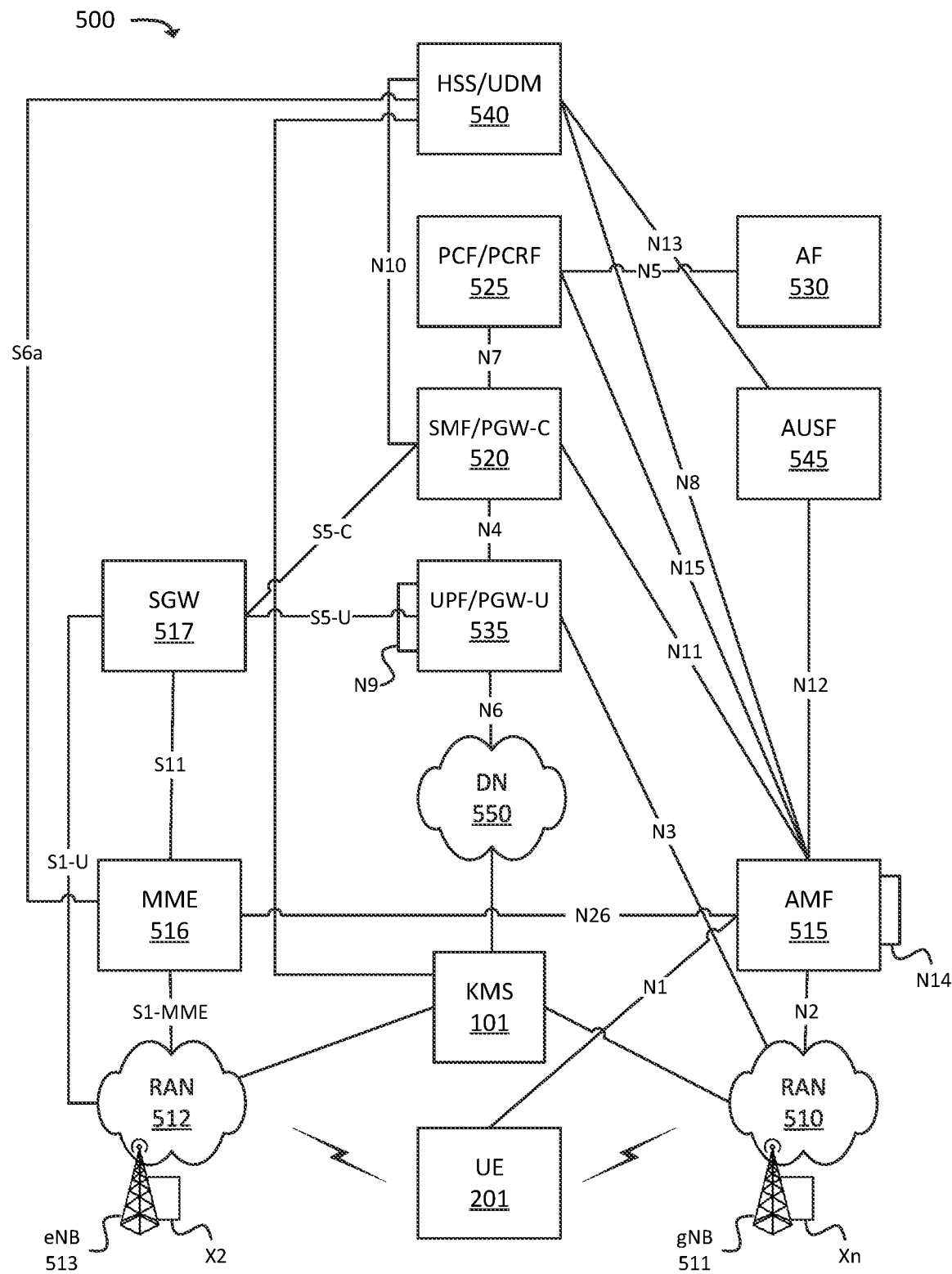
FIG. 5 illustrates an example environment in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 500 may include UE 201, RAN 510 (which may include one or more Next Generation Node Bs ("gNBs") 511), RAN 512 (which may include one or more one or more evolved Node Bs ("eNBs") 513), and various network functions such as Access and Mobility Management Function ("AMF") 515, Mobility Management Entity ("MME") 516, Serving Gateway ("SGW") 517, Session Management Function ("SMF")/Packet Data Network ("PDN") Gateway ("PGW")-Control plane function ("PGW-C") 520, Policy Control Function ("PCF")/Policy Charging and Rules Function ("PCRF") 525, Application Function ("AF") 530, User Plane Function ("UPF")/PGW-User plane function ("PGW-U") 535, Home Subscriber Server ("HSS")/Unified Data Management ("UDM") 540, and Authentication Server Function ("AUSF") 545. Environment 500 may also include one or more networks, such as Data Network ("DN") 550. Environment 500 may include one or more additional devices or systems communicatively coupled to one or more networks (e.g., DN 550, network 301, etc.), such as KPI monitoring system 101, which may include one or more devices or systems that perform some or all of the functionality described above. In some embodiments, network 301 may be, may include, and/or may be implemented by RAN 510, RAN 512, DN 550, and/or one or more other networks. In some embodiments, network 301 may include some or all of the devices or systems of environment 500.

The example shown in FIG. 5 illustrates one instance of each network component or function (e.g., one instance of SMF/PGW-C 520, PCF/PCRF 525, UPF/PGW-U 535, HSS/UDM 540, and/or AUSF 545). In practice, environment 500 may include multiple instances of such components or functions. For example, in some embodiments, environment 500 may include multiple "slices" of a core network, where each slice includes a discrete set of network functions (e.g., one slice may include a first instance of SMF/PGW-C 520, PCF/PCRF 525, UPF/PGW-U 535, HSS/UDM 540, and/or AUSF 545, while another slice may include a second instance of SMF/PGW-C 520, PCF/PCRF 525, UPF/PGW-U 535, HSS/UDM 540, and/or AUSF 545). The different slices may provide differentiated levels of service, such as service in accordance with different Quality of Service ("QoS") parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more network functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 201 may include a computation and communication device, such as a wireless mobile communication device that is capable of communicating with RAN 510, RAN 512, and/or DN 550. UE 201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 201 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 201 may communicate with one or more other elements of environment 500. UE 201 may communicate with RAN 510 via an air interface (e.g., as provided by gNB 511). For instance, RAN 510 may receive traffic (e.g., voice call traffic, data traffic, messaging traffic, signaling traffic, etc.) from UE 201 via the air interface, and may communicate the traffic to UPF/PGW-U 535, and/or one or more other devices or networks. Similarly, RAN 510 may receive traffic intended for UE 201 (e.g., from UPF/PGW-U 535, AMF 515, and/or one or more other devices or networks) and may communicate the traffic to UE 201 via the air interface.

RAN 512 may be, or may include, a LTE RAN that includes one or more base stations (e.g., one or more eNBs 513), via which UE 201 may communicate with one or more other elements of environment 500. UE 201 may communicate with RAN 512 via an air interface (e.g., as provided by eNB 513). For instance, RAN 510 may receive traffic (e.g., voice call traffic, data traffic, messaging traffic, signaling traffic, etc.) from UE 201 via the air interface, and may communicate the traffic to UPF/PGW-U 535, and/or one or more other devices or networks. Similarly, RAN 510 may receive traffic intended for UE 201 (e.g., from UPF/PGW-U 535, SGW 517, and/or one or more other devices or networks) and may communicate the traffic to UE 201 via the air interface.

AMF 515 may include one or more devices, systems, Virtualized Network Functions ("VNFs"), etc., that perform operations to register UE 201 with the 5G network, to establish bearer channels associated with a session with UE

201, to hand off UE 201 from the 5G network to another network, to hand off UE 201 from the other network to the 5G network, manage mobility of UE 201 between RANs 510 and/or gNBs 511, and/or to perform other operations. In some embodiments, the 5G network may include multiple AMFs 515, which communicate with each other via the N14 interface (denoted in FIG. 5 by the line marked "N14" originating and terminating at AMF 515).

MME 516 may include one or more devices, systems, VNFs, etc., that perform operations to register UE 201 with the EPC, to establish bearer channels associated with a session with UE 201, to hand off UE 201 from the EPC to another network, to hand off UE 201 from another network to the EPC, manage mobility of UE 201 between RANs 512 and/or eNBs 513, and/or to perform other operations.

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate the establishment of communication sessions on behalf of UE 201. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 201, from DN 550, and may forward the user plane data toward UE 201 (e.g., via RAN 510, SMF/PGW-C 520, and/or one or more other devices). In some embodiments, multiple UPFs 535 may be deployed (e.g., in different geographical locations), and the delivery of content to UE 201 may be coordinated via the N9 interface (e.g., as denoted in FIG. 5 by the line marked "N9" originating and terminating at UPF/PGW-U 535). Similarly, UPF/PGW-U 535 may receive traffic from UE 201 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 201.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 201 may communicate, through DN 550, with data servers, other UEs 201, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 201 may communicate.

Figure 6:
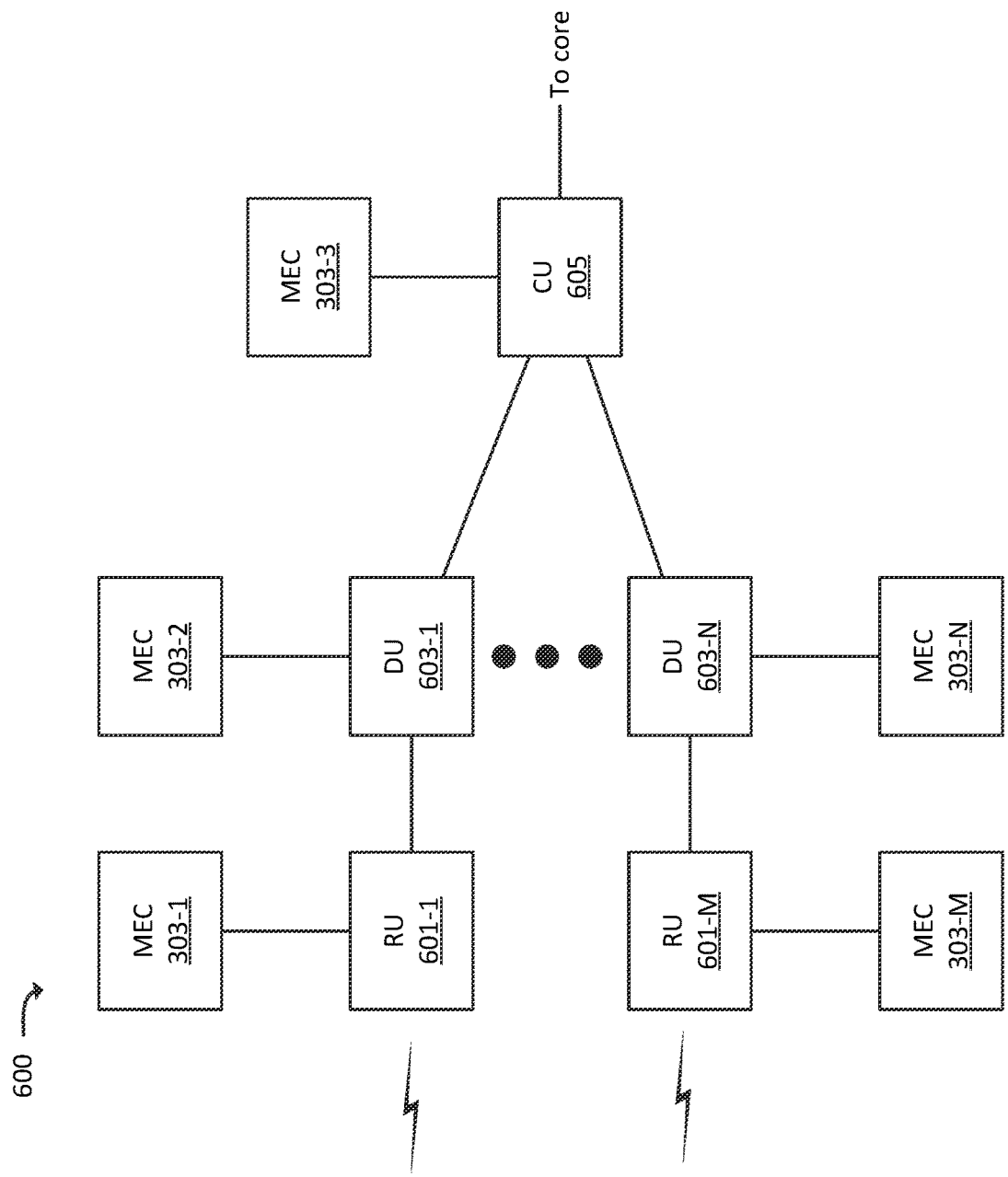
FIG. 6 illustrates an example arrangement of a radio access network ("RAN"), in accordance with some embodiments.

FIG. 6 illustrates an example Distributed Unit ("DU") network 600, which may be included in and/or implemented by one or more RANs (e.g., RAN 510, RAN 512, or some other RAN). In some embodiments, a particular RAN may include one DU network 600. In some embodiments, a particular RAN may include multiple DU networks 600. In some embodiments, DU network 600 may correspond to a particular gNB 511 of a 5G RAN (e.g., RAN 510). In some embodiments, DU network 600 may correspond to multiple gNBs 511. In some embodiments, DU network 600 may correspond to one or more other types of base stations of one or more other types of RANs. As shown, DU network 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 515 and/or UPF/PGW-U 535). In the uplink direction (e.g., for traffic from UEs 201 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 201, and may determine which DU(s) 603 should receive the downlink traffic. DU 603 may include one or more devices that transmit traffic between a core network (e.g., via CU 605) and UE 201 (e.g., via a respective RU 601). DU 603 may, for example, receive traffic from RU 601 at a first layer (e.g., physical ("PHY") layer traffic, or lower PHY layer traffic), and may process/aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 201.

RU 601 may include hardware circuitry (e.g., one or more RF transceivers, antennas, radios, and/or other suitable hardware) to communicate wirelessly (e.g., via an RF interface) with one or more UEs 201, one or more other DUs 603 (e.g., via RUs 601 associated with DUs 603), and/or any other suitable type of device. In the uplink direction, RU 601 may receive traffic from UE 201 and/or another DU 603 via the RF interface and may provide the traffic to DU 603. In the downlink direction, RU 601 may receive traffic from DU 603, and may provide the traffic to UE 201 and/or another DU 603.

RUs 601 may, in some embodiments, be communicatively coupled to one or more MECs 303. For example, RU 601-1 may be communicatively coupled to MEC 303-1, RU 601-M may be communicatively coupled to MEC 303-M, DU 603-1 may be communicatively coupled to MEC 303-2, DU 603-N may be communicatively coupled to MEC 303-N, CU 605 may be communicatively coupled to MEC 303-3, and so on. MECs 303 may include hardware resources (e.g., configurable or provisionable hardware resources) that may be configured to provide services and/or otherwise process traffic to and/or from UE 201, via a respective RU 601.

For example, RU 601-1 may route some traffic, from UE 201, to MEC 303-1 instead of to a core network (e.g., via DU 603 and CU 605). MEC 303-1 may process the traffic, perform one or more computations based on the received traffic, and may provide traffic to UE 201 via RU 601-1. In this manner, ultra-low latency services may be provided to UE 201, as traffic does not need to traverse DU 603, CU 605, and an intervening backhaul network between DU network 600 and the core network. In some embodiments, MEC 303 may include, and/or may implement, some or all of the functionality described above with respect to KPI monitoring system 101.

Figure 7:
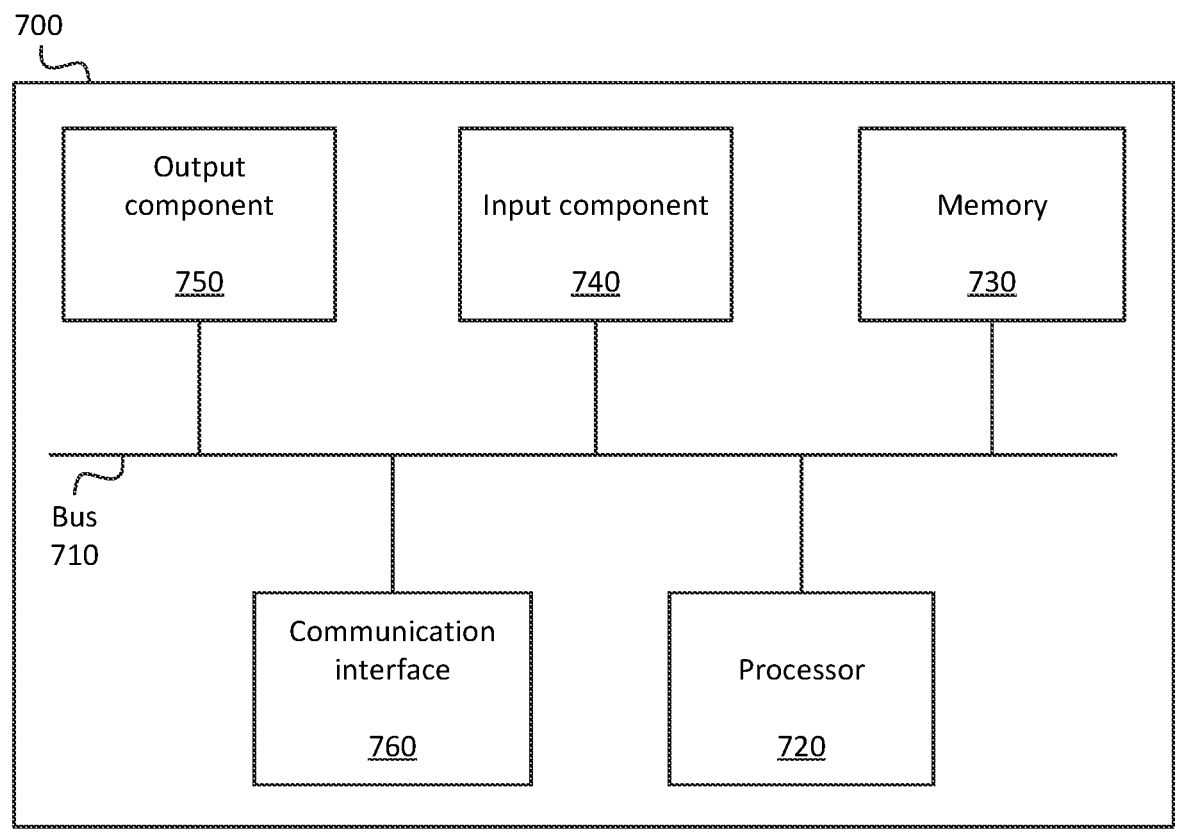
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A, 1B, and 2-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain information associating a plurality of applications with a plurality of identifiers;
receive a first request from a User Equipment ("UE") for an identifier associated with a particular application;
determine that the requested identifier is a particular identifier, of the plurality of identifiers, that is associated with the particular application;
provide the identifier to the UE in response to the first request, wherein the UE monitors Key Performance Indicator ("KPI") information associated with the UE based on execution of the particular application;
receive the monitored KPI information from the UE, wherein the monitored KPI information is provided in conjunction with the identifier;
provide a token, associated with at least one of the particular application or the particular identifier, to an application provider associated with the particular application;
receive a second request from the application provider for the monitored KPI information, wherein the second request includes the token;
authenticate the second request based on the token included in the second request; and
provide the received monitored KPI information to the application provider, wherein providing the monitored KPI information to the application provider is further based on authenticating the second request.

2. The device of claim 1, wherein the monitored KPI information is based on at least one of:
sensor data measured by the UE, or
system resources of the UE.

3. The device of claim 1, wherein the one or more processors are further configured to:
provide a Software Development Kit ("SDK") to the application provider, wherein the application implements the SDK to:
output the first request;
monitor the KPI information associated with the UE; and
output the monitored KPI information in conjunction with the particular identifier.

4. A device, comprising:
one or more processors configured to:
maintain information associating a plurality of applications with a plurality of identifiers;
receive a request from a User Equipment ("UE") for an identifier associated with a particular application, wherein the particular application is associated with a plurality of different profiles, wherein the plurality of different profiles includes at least:
a first profile associated with:
a first set of profile criteria,
a first set of KPIs to monitor, and
a first identifier, of the plurality of identifiers, and
a second profile associated with:
a second set of profile criteria,
a second set of KPIs to monitor, and
a second identifier, of the plurality of identifiers;
determine that the requested identifier is a particular identifier, of the plurality of identifiers, that is associated with the particular application;
provide the identifier to the UE in response to the request, wherein the UE monitors Key Performance Indicator ("KPI") information associated with the UE based on execution of the particular application;
receive the monitored KPI information from the UE, wherein the monitored KPI information is provided in conjunction with the identifier; and
provide the received monitored KPI information to an application provider associated with the particular application.

5. The device of claim 4, wherein the one or more processors are further configured to:
compare information regarding the UE to the first and second sets of profile criteria;
select, based on the comparing, the first profile for the UE based on the first request; and
indicate, based on selecting the first profile, the first set of KPIs to the UE, wherein the received KPI information from the UE is associated with the first set of KPIs.

6. The device of claim 1, wherein the UE monitors the KPI information, based on execution of the particular application, by monitoring the KPI information associated with the UE at times that correspond to traffic, associated with the particular application, that is sent or received by the UE.

7. A non-transitory computer-readable medium, storing a plurality of processor-executable instructions to:
- maintain information associating a plurality of applications with a plurality of identifiers;
- receive a first request from a User Equipment ("UE") for an identifier associated with a particular application;
- determine that the requested identifier is a particular identifier, of the plurality of identifiers, that is associated with the particular application;
- provide the identifier to the UE in response to the first request, wherein the UE monitors Key Performance Indicator ("KPI") information associated with the UE based on execution of the particular application;
- receive the monitored KPI information from the UE, wherein the monitored KPI information is provided in conjunction with the identifier;
- provide a token, associated with at least one of the particular application or the particular identifier, to an application provider associated with the particular application;
- receive a second request from the application provider for the monitored KPI information, wherein the second request includes the token;
- authenticate the second request based on the token included in the second request; and
- provide the received monitored KPI information to the application provider, wherein providing the monitored KPI information to the application provider is further based on authenticating the second request.

8. The non-transitory computer-readable medium of claim 7, wherein the monitored KPI information is based on at least one of:
- sensor data measured by the UE, or
- system resources of the UE.

9. The non-transitory computer-readable medium of claim 7, wherein the plurality of processor-executable instructions further include processor-executable instructions to:
- provide a Software Development Kit ("SDK") to the application provider, wherein the application implements the SDK to:
  - output the request;
  - monitor the KPI information associated with the UE; and
  - output the monitored KPI information in conjunction with the particular identifier.

10. The non-transitory computer-readable medium of claim 7, wherein the particular application is associated with a plurality of different profiles, wherein the plurality of different profiles includes at least:
- a first profile associated with:
  - a first set of profile criteria,
  - a first set of KPIs to monitor, and
  - a first identifier, of the plurality of identifiers, and
- a second profile associated with:
  - a second set of profile criteria,
  - a second set of KPIs to monitor, and
  - a second identifier, of the plurality of identifiers.

11. The non-transitory computer-readable medium of claim 10, wherein the plurality of processor-executable instructions further include processor-executable instructions to:
- compare information regarding the UE to the first and second sets of profile criteria;
- select, based on the comparing, the first profile for the UE based on the first request; and
- indicate, based on selecting the first profile, the first set of KPIs to the UE, wherein the received KPI information from the UE is associated with the first set of KPIs.

12. The non-transitory computer-readable medium of claim 7, wherein the UE monitors the KPI information, based on execution of the particular application, by monitoring the KPI information associated with the UE at times that correspond to traffic, associated with the particular application, that is sent or received by the UE.

13. A method, comprising:
- maintaining information associating a plurality of applications with a plurality of identifiers;
- receiving a first request from a User Equipment ("UE") for an identifier associated with a particular application;
- determining that the requested identifier is a particular identifier, of the plurality of identifiers, that is associated with the particular application;
- providing the identifier to the UE in response to the first request, wherein the UE monitors Key Performance Indicator ("KPI") information associated with the UE based on execution of the particular application;
- receiving the monitored KPI information from the UE, wherein the monitored KPI information is provided in conjunction with the identifier;
- providing a token, associated with at least one of the particular application or the particular identifier, to an application provider associated with the particular application;
- receiving a second request from the application provider for the monitored KPI information, wherein the second request includes the token;
- authenticating the second request based on the token included in the second request; and
- providing the received monitored KPI information to the application provider, wherein providing the monitored KPI information to the application provider is further based on authenticating the second request.

14. The method of claim 13, wherein the monitored KPI information is based on at least one of:
- sensor data measured by the UE, or
- system resources of the UE.

15. The method of claim 13, further comprising:
- providing a Software Development Kit ("SDK") to the application provider, wherein the application implements the SDK to:
  - output the first request;
  - monitor the KPI information associated with the UE; and
  - output the monitored KPI information in conjunction with the particular identifier.

16. The method of claim 13, wherein the particular application is associated with a plurality of different profiles, wherein the plurality of different profiles includes at least:
- a first profile associated with:
  - a first set of profile criteria,
  - a first set of KPIs to monitor, and
  - a first identifier, of the plurality of identifiers, and
- a second profile associated with:
  - a second set of profile criteria,
  - a second set of KPIs to monitor, and
  - a second identifier, of the plurality of identifiers,
- wherein the method further comprises:
  - comparing information regarding the UE to the first and second sets of profile criteria;
  - selecting, based on the comparing, the first profile for the UE based on the request; and indicating, based on selecting the first profile, the first set of KPIs to the UE, wherein the received KPI information from the UE is associated with the first set of KPIs.

17. The method of claim 13, wherein the UE monitors the KPI information, based on execution of the particular application, by monitoring the KPI information associated with the UE at times that correspond to traffic, associated with the particular application, that is sent or received by the UE.

18. The device of claim 4, wherein the UE monitors the KPI information, based on execution of the particular application, by monitoring the KPI information associated with the UE at times that correspond to traffic, associated with the particular application, that is sent or received by the UE.

19. The device of claim 4, wherein the monitored KPI information is based on at least one of:
   sensor data measured by the UE, or
   system resources of the UE.

20. The device of claim 4, wherein the one or more processors are further configured to:
   provide a Software Development Kit ("SDK") to the application provider, wherein the application implements the SDK to:
   output the request;
   monitor the KPI information associated with the UE; and
   output the monitored KPI information in conjunction with the particular identifier.

* * * * *